US010598931B2

(12) United States Patent
Yu et al.

(10) Patent No.: US 10,598,931 B2
(45) Date of Patent: Mar. 24, 2020

(54) LASER LIGHT SOURCE DEVICE FOR HEAD-UP DISPLAY AND HEAD-UP DISPLAY SYSTEM USING THE SAME

(71) Applicant: GWANGJU INSTITUTE OF SCIENCE AND TECHNOLOGY, Gwangju (KR)

(72) Inventors: Nan Ei Yu, Gwangju (KR); Bok Hyeon Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 128 days.

(21) Appl. No.: 15/832,179

(22) Filed: Dec. 5, 2017

(65) Prior Publication Data
US 2018/0157039 A1 Jun. 7, 2018

(30) Foreign Application Priority Data

Dec. 5, 2016 (KR) .......................... 10-2016-0164672
May 11, 2017 (KR) .......................... 10-2017-0058876

(51) Int. Cl.
*G09G 5/00* (2006.01)
*G02B 27/01* (2006.01)
(Continued)

(52) U.S. Cl.
CPC ....... *G02B 27/0101* (2013.01); *G02B 6/0005* (2013.01); *G02B 19/0009* (2013.01);
(Continued)

(58) Field of Classification Search
CPC .. G02B 27/0101; G02B 27/01; G02B 27/017; G02B 27/0172; G02B 19/0009;
(Continued)

(56) References Cited

U.S. PATENT DOCUMENTS

2006/0126184 A1* 6/2006 Kim ..................... G02B 5/1866
359/599
2006/0192094 A1* 8/2006 Taniguchi ................ G02B 5/00
250/235

(Continued)

FOREIGN PATENT DOCUMENTS

JP 2016-145938 A 8/2016
KR 10-2010-0009943 A 1/2010

OTHER PUBLICATIONS

Korean Office Action dated Jun. 21, 2018, corresponding to Korean Application No. 10-2017-0001820 citing the above reference(s).

*Primary Examiner* — Adam R. Giesy
(74) *Attorney, Agent, or Firm* — Hauptman Ham, LLP

(57) ABSTRACT

Disclosed are a laser light source device for a head-up display and a head-up display system using the same, the laser light source device for the head-up display including a plurality of light sources which emit laser light and a condensing unit which condenses the laser light emitted from the light sources, is connected to an image forming unit that generates an image for displaying information on a vehicle operation using the laser light, and provides the condensed laser light to the image forming unit.

The laser light source device for the head-up display according to the present disclosure and the head-up display system using the same have advantages that optical alignment is not easily destroyed even under harsh operating environment such as a vehicle where considerable vibration and temperature change are introduced, because the whole part of the condensing unit is optically connected by the optical fibers with a high stability on the contrary to a conventional bulk-optic based system.

15 Claims, 6 Drawing Sheets

(51) Int. Cl.
*G02B 27/09* (2006.01)
*F21V 8/00* (2006.01)
*G02B 19/00* (2006.01)
*B60W 50/14* (2020.01)

(52) U.S. Cl.
CPC ..... *G02B 19/0047* (2013.01); *G02B 27/0916* (2013.01); *B60R 2300/205* (2013.01); *B60W 2050/146* (2013.01); *G02B 2027/014* (2013.01); *G02B 2027/0181* (2013.01)

(58) Field of Classification Search
CPC .............. G02B 19/0047; G02B 6/0005; G02B 27/0916; G02B 2027/0181; G02B 2027/0112; G02B 2027/0118; G02B 2027/0141; G02B 2027/014; B60W 2050/146; B60R 2300/205
See application file for complete search history.

(56) References Cited

U.S. PATENT DOCUMENTS

| | | | | |
|---|---|---|---|---|
| 2011/0102874 A1* | 5/2011 | Sugiyama | ............ | G02B 26/101 |
| | | | | 359/205.1 |
| 2012/0155816 A1* | 6/2012 | Cottrell | .................. | G02B 6/06 |
| | | | | 385/116 |
| 2014/0043320 A1* | 2/2014 | Tosaya | ............... | G02B 27/0172 |
| | | | | 345/419 |
| 2014/0355086 A1* | 12/2014 | Sugiyama | ............ | G03H 1/2294 |
| | | | | 359/9 |

* cited by examiner

CROSS-SECTION STRUCTURE
OF OPTICAL FIBER BUNDLE

EXEMPLARY WAVELENGTH
ARRANGEMENT OF CONDENSED
LASER LIGHT SOURCE IN CROSS-
SECTION OF OPTICAL FIBER BUNDLE
(R: RED, G: GREEN, B: BLUE)

LASER LIGHT SOURCE DEVICE FOR HEAD-UP DISPLAY AND HEAD-UP DISPLAY SYSTEM USING THE SAME

CROSS-REFERENCE TO RELATED APPLICATION

This application claims priority to and the benefit of Korean Patent Application No. 10-2016-0164672, filed on Dec. 5, 2016 and No. 10-2017-0058876, filed on May 11, 2017 the disclosure of which is incorporated herein by reference in its entirety.

BACKGROUND

1. Field of the Invention

The present disclosure relates to a laser light source device for a head-up display and a head-up display system using the same, and more particularly to a laser light source device for a head-up display, in which laser light emitted from a plurality of light sources is condensed and provided to an image forming unit, and a head-up display system using the same.

2. Discussion of Related Art

A conventional built-in head-up display (HUD) for a vehicle, which has been in operation, employs a light emitting diode (LED) as a light source, and has a limitation in volume and output power of a light source when it is desired to improve visibility, contrast, and enlarge a screen size of an information device according to external environments.

In light source technologies based on the LED-based display, many LEDs such as an LED array are used to increase brightness, and therefore color uniformity is deteriorated because the LEDs are different in color temperature. Further, the LED is likely to have a problem of poor color reproducibility due to spectrum change caused by chip aging from thermal degradation or the like as time goes on. Besides, many LEDs used for obtaining desired brightness increase the volume of the light source too much, and thus make it difficult to miniaturize a display system.

Meanwhile, as another light source technology for displays other than the LED-based display, lasers in red, green and blue ranges are assembled in a bulk-optic form. Such a bulk-optic method employs only a few laser diode (LD) chips to obtain desired brightness, and therefore each LD chip needs to have high optical power. In this case, there are disadvantages in that it is generally difficult to obtain high optical power in green, blue and red ranges, or product costs rapidly increase to satisfy the power requirement.

Further, the bulk-optic method has problems in that an optical alignment process using a wavelength selection filter is required, and the optical alignment is easily destroyed under harsh operating environment such as a vehicle where considerable vibration and temperature change are introduced. In general, projection displays for generating an image have a rectangular connecting portion, and it is therefore difficult to directly link the connecting portion with the projection display to use since an output beam has a circular cross-section in the conventional laser light source technologies.

SUMMARY OF THE INVENTION

The present disclosure is directed to a laser light source device for a head-up display, in which a condensing unit is provided having an optical fiber and an optical fiber bundle, and an input optical fiber and an output optical fiber are divisionally connected to an exit side of the optical fiber bundle and easily connectable to a polygonal connecting portion of an image forming unit, and a head-up display system using the same.

According to an aspect of the present disclosure, there is provided a laser light source device for a head-up display, including: a plurality of light sources which emit laser light; and a condensing unit which condenses the laser light emitted from the light sources, is connected to an image forming unit that generates an image for displaying information on a vehicle operation using the laser light, and provides the condensed laser light to the image forming unit.

The condensing unit may include an optical fiber bundle which includes a plurality of incident optical fibers, a first end of which is connected to the light sources, so as to receive the laser light; an exit-side input optical fiber which is connected to the optical fiber bundle so as to receive the laser light passed through the incident optical fibers, and is internally provided with a condensing path to condense the laser light received therein; and an exit-side output optical fiber which includes a first end connected to a second end of the exit-side input optical fiber, a second end connected to the image forming unit, and an output path configured to connect with the condensing path so that the laser light condensed by the exit-side input optical fiber can be output to the image forming unit.

Meanwhile, the condensing unit may include an optical fiber bundle which includes a plurality of incident optical fibers, a first end of which is connected to the light sources, so as to receive the laser light; and an exit-side output optical fiber which is connected to the optical fiber bundle so as to receive the laser light passed through the incident optical fibers, includes a second end connected to the image forming unit, and is internally provided with an output path so as to output the laser light passed through the optical fiber bundle to the image forming unit.

The optical fiber bundle may include the incident optical fibers fused and coupled in a bundle.

The output path of the exit-side output optical fiber may have a polygonal cross-section so as to be connected to a polygonal-shaped connecting portion of the image forming unit.

In this case, the output path of the exit-side output optical fiber may have a rectangular cross-section.

Further, the output path of the exit-side output optical fiber may include a second end connected to the image forming unit and having a polygonal cross-section, and a first end having a cross-section different from the cross-section of the second end, and the cross section may be gradually changed to have a shape corresponding to the cross-section of the first end in a direction from the second end toward the first end.

Meanwhile, according to an aspect of the present disclosure, there is provided a head-up display system including: a light source device which includes a plurality of light sources for emitting laser light, and a condensing unit for condensing the laser light emitted from the light sources; and an image forming unit which is connected to the condensing unit and generates an image including information on a vehicle operation using the condensed laser light from the condensing unit.

The condensing unit may include an optical fiber bundle which includes a plurality of incident optical fibers, a first end of which is connected to the light sources, so as to receive the laser light; an exit-side input optical fiber which is connected to the optical fiber bundle so as to receive the laser light passed through the incident optical fibers, and is internally provided with a condensing path to condense the laser light received therein; and an exit-side output optical fiber which includes a first end connected to a second end of the exit-side input optical fiber, a second end connected to the image forming unit, and an output path configured to connect with the condensing path so that the laser light condensed by the exit-side input optical fiber can be output to the image forming unit.

Meanwhile, the condensing unit may include an optical fiber bundle which includes a plurality of incident optical fibers, a first end of which is connected to the light sources, so as to receive the laser light; and an exit-side output optical fiber which is connected to the optical fiber bundle so as to receive the laser light passed through the incident optical fibers, includes a second end connected to the image forming unit, and is internally provided with an output path so as to output the laser light passed through the optical fiber bundle to the image forming unit.

The optical fiber bundle may include the incident optical fibers fused and coupled in a bundle.

The output path of the exit-side output optical fiber may have a polygonal cross-section so as to be connected to a polygonal-shaped connecting portion of the image forming unit.

The output path of the exit-side output optical fiber may have a rectangular cross-section.

The output path of the exit-side output optical fiber may include a first end having a cross-section different from a polygonal cross-section of a second end, and the cross section may be gradually changed to have a shape corresponding to the cross-section of the second end in a direction from the first end toward the second end.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Below, a laser light source device for a head-up display and a head-up display system using the same according to embodiments of the present disclosure will be described with reference to accompanying drawings. Since the present disclosure may be variously modified and include many embodiments, exemplary embodiments will be illustrated in the accompanying drawings and described in detail in this specification. However, these are not intended to limit the present disclosure to the specific embodiments, and it will be appreciated that all changes, equivalents and substitutes can be made without departing from the spirit and scope of the present disclosure. Throughout the description with reference to the accompanying drawings, like numerals refer to like elements. In the accompanying drawings, the dimensions of the elements may be exaggerated for the clarity of the present disclosure.

It will be understood that, although the terms "first," "second," etc. may be used herein to describe various elements, these elements should not be limited by these terms. These terms are only used to distinguish one element from another. For example, a first element could be named a second element, and, similarly, the second element could be named the first element, without departing from the scope of the present disclosure.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise," or "include" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Figure 1A:
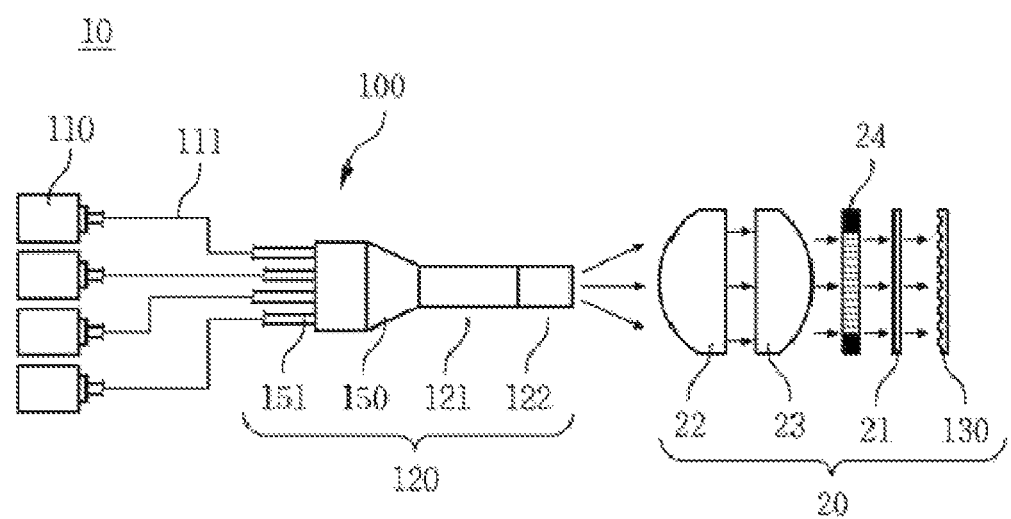
FIG. 1A is a conceptual view of a laser light source device for a head-up display according the present disclosure and a head-up display system using the same.

FIG. 1A shows a head-up display system 10 including a laser light source device 100 for a head-up display according to the present disclosure and an image forming unit 20.

Referring to FIG. 1A, the laser light source device 100 for the head-up display includes a plurality of light sources 110 for emitting laser light, and a condensing unit 120 for condensing the laser light emitted from the light sources 110.

The light source 110 emits the laser light corresponding to one of red, green and blue (RGB) colors as a laser diode (LD) for emitting the laser light. In this laser light source device 100 for the head-up display, the light sources 110 for emitting the laser light of each color need to be properly arranged so that RGB colors of the laser light can be uniformly distributed. Further, an optical cable 111 is provided between the light source 110 and the condensing unit 120 and transfers the laser light emitted from the light sources 110 to the condensing unit 120. The optical cable 111 is made of an optical fiber capable of transmitting the laser light, and is coupled with an external coating, a sheath (jacket), or the like for protection.

The condensing unit 120 includes an optical fiber bundle 150 provided with a plurality of incident optical fibers 151 connected to the optical cables 111 so as to receive the laser light, an exit-side input optical fiber 121 connected to an exit-side end of the optical fiber bundle 150 and internally provided with a condensing path to condense the laser light received therein, and an exit-side output optical fiber 122 connected to the other end of the exit-side input optical fiber 121.

Figure 1B:
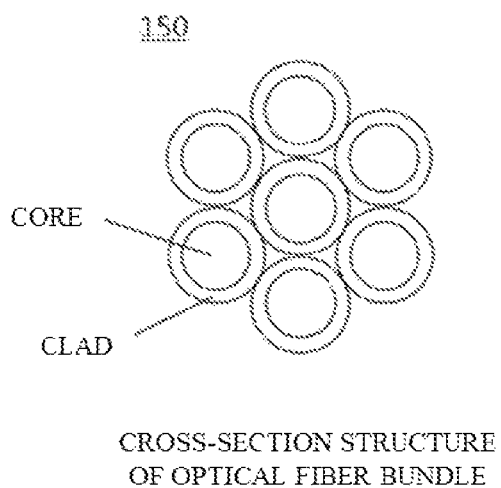
FIG. 1B is a cross-sectional view of an optical fiber bundle of the laser light source device for the head-up display according to the present disclosure.
Figure 1B:
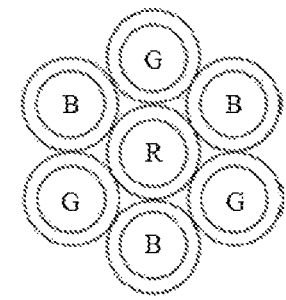

The laser light source device 100 for the head-up display according to the present disclosure, the head-up display system 10 using the same, and the condensing unit 120 are characterized in using the optical fiber bundle 150. As shown in FIG. 1B, a plurality of incident optical fibers 151 needed for obtaining predetermined optical power are grouped in a bundle structure, thereby forming the optical fiber bundle 150. In more detail, the optical fiber bundle 150 is formed by melting using a heat source such as an arc, a heater, and a laser, and has a shape in which a plurality of optical fibers are fused and coupled with one another in the bundle structure. To reduce optical loss, the optical fiber bundle 150 has a tapering structure in which an outer diameter thereof is decreased toward the exit side.

The number of laser light sources 110 in each wavelength, which are connected to the optical cable 111 and condensed through the condensing unit 120, may be easily adjusted and used in accordance with total power and optical power needed for each wavelength. Further, as shown in FIG. 1B, when the light source 110 is condensed with the structure of the optical fiber bundle 150, the structure in which the laser light sources 110 for each wavelength are arranged in a bundle cross-sectional structure is adjustable by controlling light connecting arrangement between the optical cable 111 and the incident optical fibers 151, thereby advantageously making the laser light for each wavelength which is finally emitted to the exit-side output optical fiber 122 be uniformly distributed on this cross-sectional structure.

The incident optical fiber 151 has one end connected to the light sources 110 by the optical cable 111. Although it is not shown, the incident optical fiber 151 may employ an optical fiber that includes a first core via which the laser light received through the optical fiber can travel, and a first clad formed to surround an outer circumferential surface of the first core. The first core may be formed of a glass or polymer material having a predetermined refractive index, and the first clad may be formed of a glass or polymer material having a refractive index lower than that of the first core. The incident optical fiber 151 may preferably have a numerical aperture (NA, $\sqrt{n_1^2-n_2^2}$, where $n_1$ is the refractive index of the first core, and $n_2$ is the refractive index of the first clad) of 0.06 to 0.30. More preferably, for the compatibility with a commercial optical fiber, the incident optical fiber 151 can have an NA of 0.12 to 0.25. In this case, the first core of the incident optical fiber 151 forms an internal path in which the laser light is condensed.

As sated above, the optical fiber bundle 150 may include the incident optical fibers 151 which are fused and coupled in a bundle.

The exit-side input optical fiber 121 has one end connected to the optical fiber bundle 150, and may employ an optical fiber that includes a second core and a second clad formed to surround an outer circumferential surface of the second core even though it is not illustrated. The second core forms the condensing path, and may be formed of a glass or polymer material having a predetermined refractive index. The second clad may be formed of a glass or polymer material having a refractive index lower than that of the second core, and the exit-side input optical fiber 121 may have a numerical aperture (NA, $\sqrt{n_3^2-n_4^2}$, where $n_3$ is the refractive index of the second core, and $n_4$ is the refractive index of the second clad) of 0.35 to 0.50. More preferably, in consideration of coupling efficiency between the incident optical fiber 151 and the exit-side input optical fiber 121, the exit-side input optical fiber 121 may have an NA of 0.40 to 0.50. In this case, the second core of the exit-side input optical fiber 121 forms the condensing path in which the laser light is condensed.

The exit-side output optical fiber 122 has one end connecting with the exit-side input optical fiber 121, and may employ an optical fiber that includes a third core 123 and a third clad 124 formed to surround an outer circumferential surface of the third core 123. The third core 123 forms the output path and may be formed of a glass or polymer material having a predetermined refractive index, and the third clad 124 may be formed of a polymer material. In this case, the exit-side output optical fiber 122 may have an numerical aperture (NA, $\sqrt{n_5^2-n_6^2}$, where $n_5$ is the refractive index of the third core, and $n_6$ is the refractive index of the third clad) equal to or higher than the NA of the exit-side input optical fiber 121 in order to prevent the optical loss.

Although it is not illustrated, the image forming unit 20 includes a housing that is internally provided with a traveling path via which the laser light travels and has one end to which the end of the exit-side output optical fiber 122 is connected so that the laser light can enter the traveling path, and a display panel 21 that is provided inside the housing and generates an image including information on a vehicle using the laser light. In this case, a connecting portion communicates with the inside of the housing, and has a polygonal connecting port (not shown). The other end of the exit-side output optical fiber 122 is also formed to have a polygonal shape corresponding to the connector to be connected to the connector.

In this case, the optical cable 111, the incident optical fiber 151, the optical fiber bundle 150, the exit-side input optical fiber 121, and the exit-side output optical fiber 122 may preferably be connected to each other by a fusion splicing method.

Meanwhile, the exit-side input optical fiber 121 and the exit-side output optical fiber 122 may have a structure of including only the core without the clad. Even in this case, the exit-side input optical fiber 121 and the exit-side output optical fiber 122 is capable of light transmission since ambient air having a refractive index of 1 serves as the clad. However, the exit-side optical fibers have to be fastened to the housing of the condensing unit 120, and therefore at least some of these optical fibers may have the clad made of glass or polymer.

To avoid the optical loss, the third core of the exit-side output optical fiber 122 may have a size the same as or bigger than that of the second core of the exit-side input optical fiber 121. In this case, the cross-sectional size of the third core of the exit-side output optical fiber 122 may be determined based on the size of a beam pattern required for the image forming unit 20. Therefore, the cross-sectional size of the third core of the exit-side output optical fiber 122 may be at most less than or equal to hundreds of micrometers, or at least equal to or more than several millimeters. The condensing unit 120, which is used in the laser light source device 100 for the head-up display according to the present disclosure and the head-up display system 10 using the same, is mainly characterized in that the exit-side optical fiber is divided into two parts, that is, the exit-side input optical fiber 121 and the exit-side output optical fiber 122. In particular, when the condensing unit 120 is spaced apart at a predetermined distance from the image forming unit 20, the condensed laser light can be conveniently transmitted to the image forming unit 20 by easily adjusting a length of the exit-side input optical fiber 121 relatively thinner than and thus more flexible than the exit-side output optical fiber 122.

The shape and size of the core in the exit-side output optical fiber 122 are determined corresponding to the shape and size of the image forming unit 20. Therefore, when the input portion of the image forming unit 20 has a rectangular shape, the core of the exit-side output optical fiber 122 may have a rectangular shape for compatibility.

Further, for example, when the size, shape, refractive index characteristic (NA), etc. of the core in the exit-side output optical fiber 122 are equal to those of the exit-side input optical fiber 121, the condensing unit may be configured without the exit-side input optical fiber 121.

The condensing unit 120 with this configuration according to the present disclosure, the laser light source device 100 for the head-up display, and the head-up display system 10 using the same have advantages that the optical alignment is not easily destroyed even under harsh environment such as a vehicle where vibration and temperature change are intense, because the whole part of the condensing unit 120 is optically connected by the optical fibers with a high stability on the contrary to a conventional bulk-optic based system.

Below, the laser light source device 100 for the head-up display according to the present disclosure will be described in more detail with reference to FIG. 2.

Figure 2:
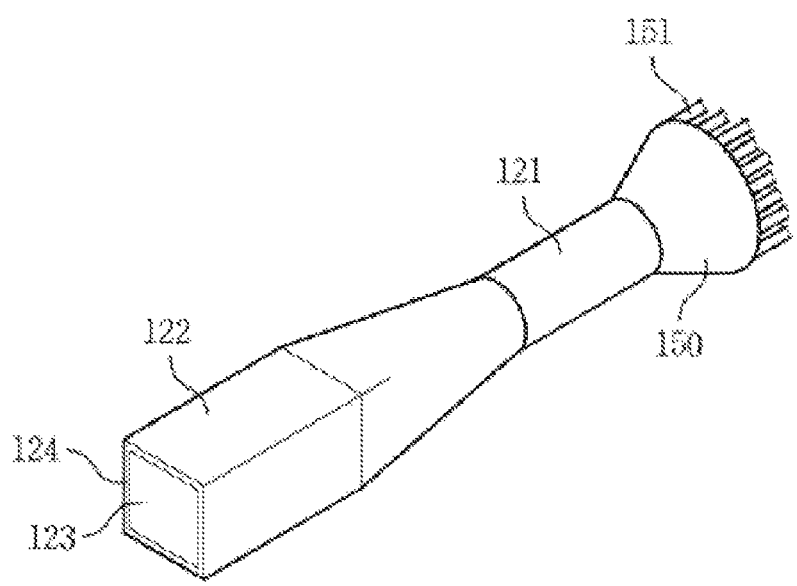
FIG. 2 is a perspective view of a condensing unit in the laser light source device for the head-up display of FIG. 1.

FIG. 2 illustrates the optical fiber bundle 150 with the plurality of incident optical fibers 151, and the condensing unit 120 with the exit-side input optical fiber 121 having a circular cross-sectional structure, and the exit-side output optical fiber 122 having a polygonal cross-sectional structure.

The condensing path of the exit-side output optical fiber 122 has one end having a cross-section different from that of the exit-side input optical fiber 121. In this case, in order to reduce the optical loss, the condensing path, i.e. the third core of the exit-side output optical fiber 122 tapers from the other end toward the exit-side input optical fiber 121 so that the polygonal cross-section at the other end of the exit-side output optical fiber 122 can be gradually changed to have a shape corresponding to the circular cross-section of the exit-side input optical fiber 121.

Meanwhile, the output path, i.e. the third core of the exit-side output optical fiber 122 is formed to have a cross-section of a polygonal shape such as a rectangular shape. The example of FIG. 2 shows that the end of the exit-side output optical fiber 122 is formed to have a rectangular shape, but the third core of the exit-side output optical fiber 122 is not limited to this shape. Alternatively, the end of the exit-side output optical fiber 122 may have a polygonal shape such as a hexagon and a triangle in accordance with a structure of the connecting portion of the image forming unit 20.

The foregoing condensing unit 120 may be manufactured to taper and have the circular cross-section matching with the end of the exit-side input optical fiber 121 by a fused tapering method of partially fusing the exit-side output optical fiber 122 having the polygonal shape. Therefore, the exit-side output optical fiber 122 has the polygonal cross-section at the other end, i.e. in an output direction.

A conventional connecting portion of the image forming unit 20 generally has a polygonal shape such as a rectangle. Further, a general optical fiber has a circular cross-section. Therefore, when the optical fiber is connected to the connecting portion of the image forming unit 20, a slit or the like is used to cut and make the beam pattern into a rectangular pattern or a separated optical element is used to modify the beam pattern. In the case where the circular beam pattern is cut into the rectangular pattern, an optical loss of about 36% occurs. In the case where the separated optical element is used, costs of manufacturing the system increase and it is cumbersome since additional parts and manufacturing processes are needed. On the other hand, the laser light source device 100 for the head-up display according to the present disclosure does not need additional manufacturing processes or optical elements, prevents the increase in optical loss due to the use of the additional optical elements, and readily obtains a polygonal beam pattern having uniform optical-intensity distribution since the other end of the exit-side output optical fiber 122 has a polygonal shape corresponding to the connecting portion of the image forming unit 20.

As an example, further, the beam pattern required for the image forming unit 20 can be a big size equal to or larger than 1 mm, and therefore the cross-sectional size (thickness) of the exit-side output optical fiber 122 has to be also increased. In this case, the exit-side output optical fiber 122 decreases in flexibility, and increases in costs. Accordingly, the exit-side input optical fiber 121, which is relatively thinner and thus more flexible than the exit-side output optical fiber 122 and inexpensive, is used to primarily transmit the condensed laser light to the vicinity of the image forming unit 20, and then the exit-side output optical fiber 122 is used at an end portion of the condensing unit 120 to thereby secure the performance and economic feasibility of the laser light source device 100 for the head-up display, and this is one of other advantages of the present disclosure.

Figure 3:
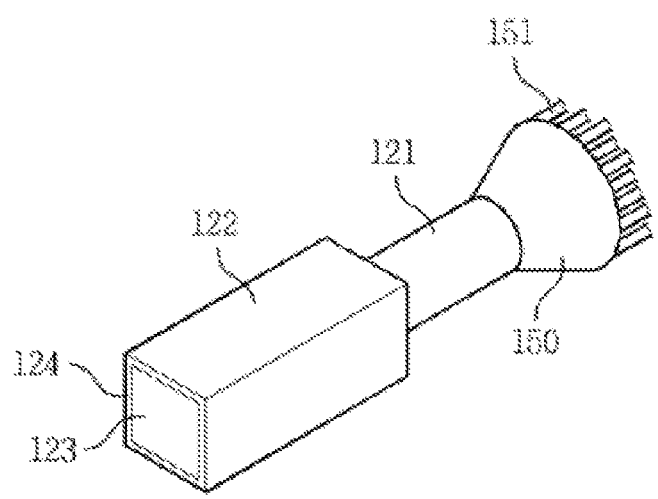
FIG. 3 is a perspective view of a condensing unit in a laser light source device for a head-up display according to another embodiment of the present disclosure.

Meanwhile, FIG. 3 shows a condensing unit according to another embodiment of the present disclosure.

The same reference numerals refer to elements having the same function as those shown in the previous drawings.

Referring to FIG. 3, an output path, i.e. a third core 123 of the exit-side output optical fiber 122 has a polygonal cross-section, which does not taper but is uniform along its lengthwise direction. Meanwhile, the exit-side input optical fiber 121 shown in FIG. 3 may have a structure of including only the second core without the second clad. As described above, the exit-side input optical fiber 121 without the second clad is capable of optical transmission since an ambient air layer serves as the second clad.

Figure 4:
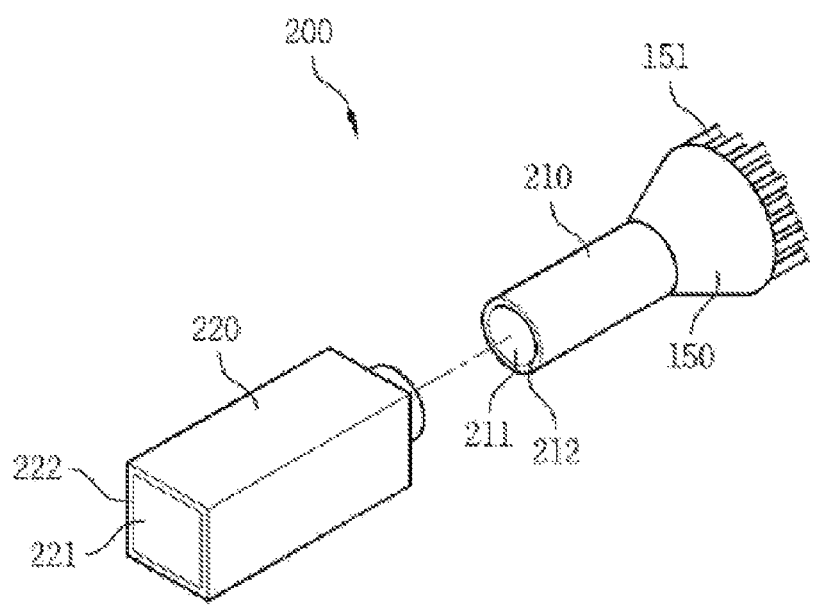
FIG. 4 is a perspective view of a condensing unit in a laser light source device for a head-up display according to still another embodiment of the present disclosure.

Further, FIG. 4 shows an exit-side input optical fiber 210 and an exit-side output optical fiber 220 according to still another embodiment of the present disclosure. On the contrary to the exit-side input optical fiber 121 shown in FIG. 3, the exit-side input optical fiber 210 shown in FIG. 4 includes a second core 211 and a second clad 212.

Referring to FIG. 4, the exit-side output optical fiber 220 has one end connected to the other end of the exit-side input optical fiber 210, and is formed with a third core 221 to be in contact with the second core 211 of the exit-side input optical fiber 210. In this case, the condensing path, i.e. the second core 211 of the exit-side input optical fiber 210 has a circular cross-section, and the output path, i.e. the third core 221 of the exit-side output optical fiber 220 has a polygonal cross-section such as a rectangular cross-section uniform along the lengthwise direction.

In this embodiment, the output path, i.e. the third core 221 of the exit-side output optical fiber 220 is formed to have a larger cross-sectional size than that of the condensing path, i.e. the second core 211 of the exit-side input optical fiber 210. Further, the exit-side output optical fiber 220 may be bonded to the other end of the exit-side input optical fiber 210 by the fusion splicing method.

FIG. 4 illustrates one embodiment of the present disclosure, in which both the third core of the exit-side output optical fiber 220 and the outer circumferential surface of the optical fiber, i.e. the third clad have the rectangular cross-section. Here, it is important to make the beam pattern of the laser light emitted from the exit-side output optical fiber 220 have a polygonal beam pattern, in general, a rectangular pattern required for the image forming unit 20. The beam pattern of the laser light emitted from the exit-side output optical fiber 220 is varied depending on the shape of the third core. Accordingly, it is enough that the third core 221 of the output optical fiber 220 having a high refractive index has a rectangular structure to make the rectangular beam pattern. Thus, the outer circumferential surface, that is the third clad 222, of the exit-side output optical fiber 220 can have a circular shape.

Figure 5:
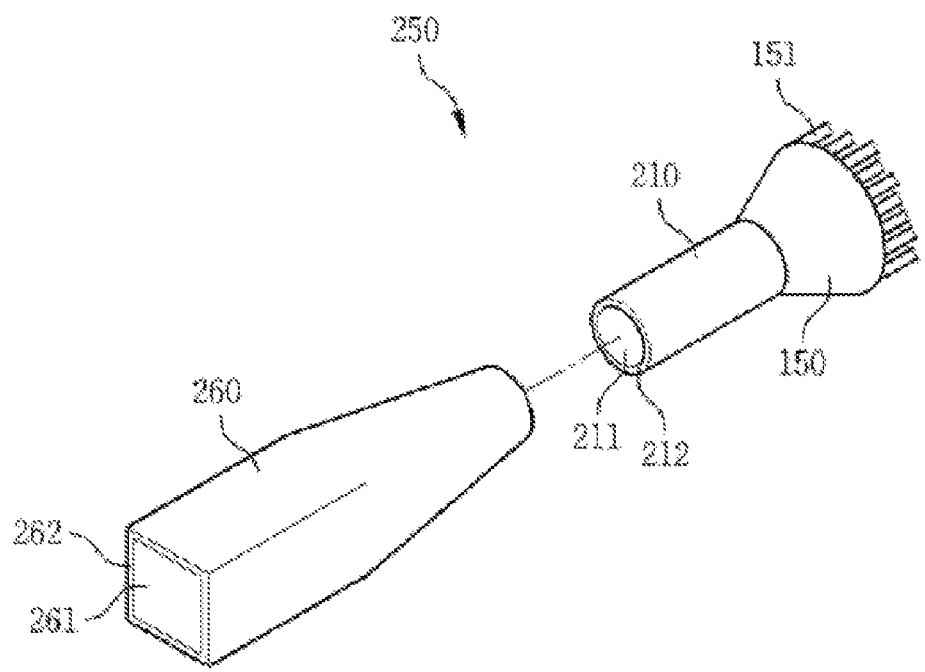
FIG. 5 is a perspective view of a condensing unit in a laser light source device for a head-up display according to yet another embodiment of the present disclosure.

Meanwhile, FIG. 5 shows the exit-side input optical fiber 210, an exit-side output optical fiber 260, and a condensing unit using the same according to yet another embodiment of the present disclosure. In this case, the exit-side input optical fiber 210 includes the second core 211 and the second clad 212, and the output optical fiber 260 includes a third core 261 and a third clad 262.

Referring to FIG. 5, one end, which is adjacent to the exit-side input optical fiber 210, of an output path of the exit-side output optical fiber 260 has a cross-section different in shape from a polygonal cross-section of the other end. That is, the one end of the output path of the exit-side output optical fiber 260 is formed to have a circular cross-section corresponding to the cross-section of the condensing path of the exit-side input optical fiber 210. In this case, the output path, i.e. the third core 261 of the exit-side output optical fiber 260 is gradually changed to have a shape corresponding to the polygonal cross-section of the other end in a direction from the one end toward the other end.

On the contrary, an optical input path, i.e. the third core 261 of the exit-side output optical fiber 260 is gradually changed to have a shape corresponding to the circular cross-section in a direction toward the one end adjacent to the exit-side input optical fiber 210. When the exit-side output optical fiber 260 is manufactured, the exit-side output optical fiber 260 having the polygonal cross-section is partially subjected to fusion or tapering using a heat source such as an arc, a heater, and a laser, and gradually changed to have a circular cross-section corresponding to the end of the exit-side input optical fiber 210. Of course, as described above, the exit-side output optical fiber 260 may be directly connected to the incident optical fiber bundle 150 without the exit-side input optical fiber 210 when the condensing unit 120 is configured.

Below, a head-up display system using the foregoing light source device for the head-up display according to the present disclosure will be described in more detail.

The head-up display system 10 includes the plurality of light sources 110 for emitting the laser light and the light source device 100 that includes the condensing unit 120 for condensing the laser light emitted from the light sources 110, and the image forming unit 20 that is connected to the condensing unit 120 and generates an image including information on a vehicle operation using the condensed laser light from the condensing unit 120.

As exemplarily shown in FIG. 1A, the image forming unit 20 includes the housing (not shown) internally provided with the traveling path via which the laser light travels and including the connecting portion at one end thereof to which the end of the exit-side output optical fiber 122 is connected so that the laser light can enter the traveling path, and the display panel 21 installed inside the housing and generating an image including information on a vehicle using the laser light. Further, there may be provided a plurality of optical lenses 22 and 23 which are placed in front of the display panel 21 with respect to an exit direction of the laser light and beam-shape the laser light incident on the display panel 21 suitably for the display panel 21. In this case, the optical lenses 22 and 23 for beam-shaping the laser light are configured to have a predetermined size, a refractive index, and a structure suitable for forming an image.

The display panel 21 may employ a liquid crystal on silicon (LCoS) display, an LCD panel, etc. The display panel 21 generates an image including information on a vehicle operation using the laser light received from the light source device. In this case, the information on the vehicle operation includes guide information about a destination, vehicle speed, and a warning message. Meanwhile, a polarization filter 24 may be provided between the optical lenses 22 and 23 and the display panel 21, and make the laser light transmitted therethrough be polarized to have a polarized component suitable for the display panel 21.

Further, a diffraction optical element 130 having a function of reducing speckle noise in the received laser light or image may be arranged in the image forming unit 20 and provide an image of high quality to a driver of a vehicle.

The laser light source device for the head-up display according to the present disclosure and the head-up display system using the same have advantages that the optical alignment is not easily destroyed even under conditions where vibration and temperature change are intense like a vehicle, because the condensing unit is entirely and stably connected optically by the optical fibers on the contrary to the conventional bulk-optic method.

The laser light source device for the head-up display according to the present disclosure and the head-up display system using the same can reduce costs and manpower required in assembling since the output port of the condensing unit for condensing the laser light emitted from the light sources has a polygonal shape and is thus easily coupled to the polygonal-shaped connecting portion of the image forming unit.

The laser light source device for the head-up display according to the present disclosure and the head-up display system using the same can secure performance, flexibility and economic feasibility because the exit-side optical fiber is divided into the exit-side input optical fiber and the exit-side output optical fiber.

Descriptions on disclosed embodiments are provided to be used or realized by a person having an ordinary skill in the art. It will be apparent to a person having an ordinary skill in the art that various modifications can be made to these exemplary embodiments of the present disclosure, and general principles defined herein are applied to other embodiments without departing from the spirit or scope of the disclosure. Therefore, the present disclosure is not limited to the foregoing embodiments, but needs to be interpreted within the proposed principles, novel features and the widest consistent ranges.

What is claimed is:

1. A laser light source device for a head-up display, comprising:
   a plurality of light sources which emit laser light;
   an exit-side input optical fiber comprising a condensing path to condense the emitted laser light internally; and
   an exit-side output optical fiber comprising an output path configured to connect with the condensing path, wherein the exit-side output optical fiber is connected to the exit-side input optical fiber, wherein a size of a core of the exit-side input optical fiber is smaller than a size of a core of the exit-side output optical fiber.

2. The laser light source device for the head-up display according to claim 1, wherein the condensing unit comprises:
an optical fiber bundle which comprises a plurality of incident optical fibers, a first end of which is connected to the light sources, so as to receive the laser light;
wherein the exit-side input optical fiber which is connected to the optical fiber bundle so as to receive the laser light passed through the incident optical fibers, and
wherein the exit-side output optical fiber comprises a first end connected to a second end of the exit-side input optical fiber, a second end connected to an image forming unit so that the laser light condensed by the exit-side input optical fiber can be output to the image forming unit.

3. The laser light source device for the head-up display according to claim 1, wherein the condensing unit comprises:
an optical fiber bundle which comprises a plurality of incident optical fibers, a first end of which is connected to the light sources, so as to receive the laser light,
wherein the exit-side output optical fiber is connected to the optical fiber bundle so as to receive the laser light passed through the incident optical fibers, comprises a second end connected to an image forming unit, and is internally provided with the output path so as to output the laser light passed through the optical fiber bundle to the image forming unit.

4. The laser light source device for the head-up display according to claim 2 or 3, wherein the optical fiber bundle comprises the incident optical fibers fused and coupled in a bundle.

5. The laser light source device for the head-up display according to claim 2 or 3, wherein the output path of the exit-side output optical fiber comprises a core having a polygonal cross-section so as to be connected to a polygonal-shaped connecting portion of the image forming unit.

6. The laser light source device for the head-up display according to claim 5, wherein the output path of the exit-side output optical fiber comprises a core having a rectangular cross-section.

7. The laser light source device for the head-up display according to claim 5, wherein the output path of the exit-side output optical fiber comprises a second end connected to the image forming unit and having a polygonal cross-section, and a first end having a cross-section different from the cross-section of the second end, and the cross section is gradually changed to have a shape corresponding to the cross-section of the first end in a direction from the second end toward the first end.

8. A head-up display system comprising:
a light source device which comprises a plurality of light sources for emitting laser light, and a condensing unit for condensing the laser light emitted from the light sources; and
an image forming unit Which is connected to the condensing unit and generates an image comprising information on a vehicle operation using the condensed laser light from the condensing unit, wherein the condensing unit comprises:
an exit-side input optical fiber comprising a condensing path to condense the emitted laser light internally; and
an exit-side output optical fiber comprising an output path configured to connect with the condensing path, wherein the exit-side output optical fiber is connected to the exit-side input optical fiber, and
wherein a size of a core of the exit-side input optical fiber is smaller than a size of a core of the exit-side output optical fiber.

9. The head-up display system according to claim 8, wherein the condensing unit comprises:
an optical fiber bundle which comprises a plurality of incident optical fibers, a first end of which is connected to the light sources, so as to receive the laser light;
wherein the exit-side input optical fiber which is connected to the optical fiber bundle so as to receive the laser light passed through the incident optical fibers, and
wherein the exit-side output optical fiber comprises a first end connected to a second end of the exit-side input optical fiber, a second end connected to the image forming unit so that the laser light condensed by the exit-side input optical fiber can be output to the image forming unit.

10. The head-up display system according to claim 8, wherein the condensing unit comprises:
an optical fiber bundle which comprises a plurality of incident optical fibers, a first end of which is connected to the light sources, so as to receive the laser light,
wherein the exit-side output optical fiber is connected to the optical fiber bundle so as to receive the laser light passed through the incident optical fibers, comprises a second end connected to the image forming unit, and is internally provided with the output path so as to output the laser light passed through the optical fiber bundle to the image forming unit.

11. The head-up display system according to claim 9 or 10, wherein the optical fiber bundle comprises the incident optical fibers fused and coupled in a bundle.

12. The head-up display system according to claim 9 or 10, wherein the output path of the exit-side output optical fiber comprises a core having a polygonal cross-section so as to be connected to a polygonal-shaped connecting portion of the image forming unit.

13. The head-up display system according to claim 12, wherein the output path of the exit-side output optical fiber comprises a core having a rectangular cross-section.

14. The head-up display system according to claim 12, wherein the output path of the exit-side output optical fiber comprises a first end having a cross-section different from a polygonal cross-section of a second end, and the cross section is gradually changed to have a shape corresponding to the cross-section of the second end in a direction from the first end toward the second end.

15. The head-up display system according to claim 8, wherein the light source device further comprises a diffraction optical element provided on an output path of the image output from the image forming unit, configured to transmit the image, and reduce speckle noise in the image.

* * * * *